3,021,326
PURIFICATION OF CAPROLACTAM

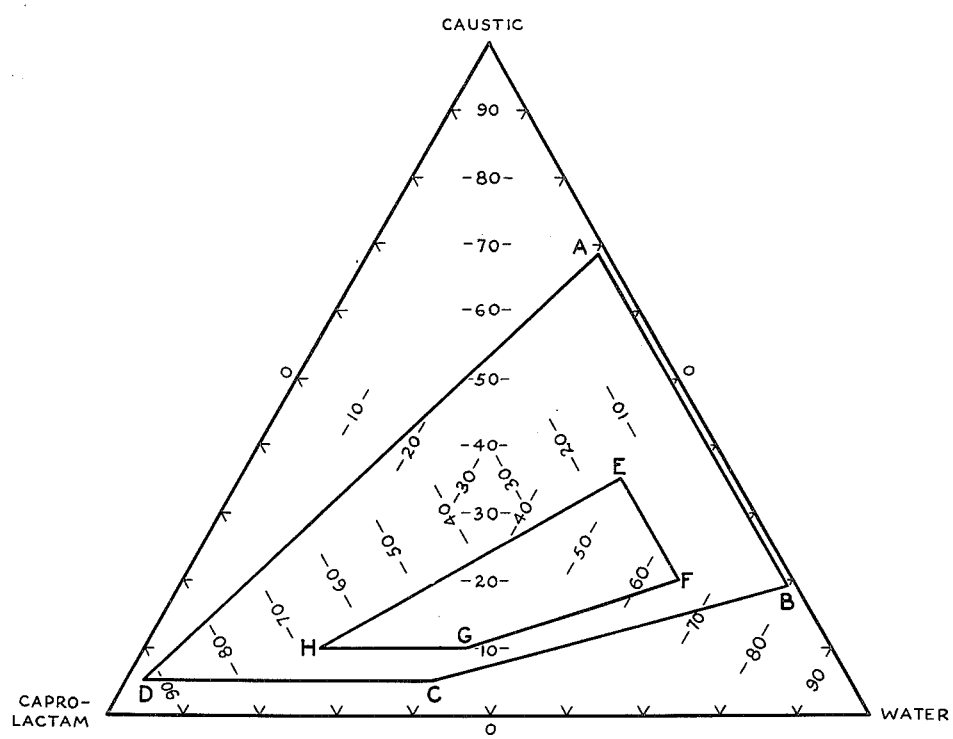

Orvill E. Snider, Petersburg, Reed H. Belden, Hopewell, and Donald R. Beuerman, Chester, Va., and Donald W. Seebohm, East Aurora, N.Y., assignors to Allied Chemical Corporation, New York, N.Y., a corporation of New York
Filed Sept. 8, 1958, Ser. No. 759,729
3 Claims. (Cl. 260—239.3)

This invention relates to purification of epsilon-caprolactam, more particularly to removal of oxidizable organic impurities therefrom.

Epsilon-caprolactam, hereinafter generally called "caprolactam" or "lactam," is a valuable starting material for production of synthetic linear polyamides having utility in the form of filaments, extruded articles, molded articles, etc. A very high purity caprolactam is required to assure good quality in polyamides produced therefrom. A troublesome problem has been to separate certain oxidizable organic impurities from the caprolactam. Presence of these impurities is indicated by reaction of the lactam with potassium permanganate solution. Quantitatively, the concentration of oxidizable impurities can be expressed as "permanganate number," P.N., found by adding 1 ml. of $N/100 KMnO_4$ aqueous solution to 50 ml. of 0.1% caprolactam aqueous solution; maintaining agitation for 250 seconds; and measuring optical density of the resulting mixture in a cell of 5 cm. path with light of 410 millimicron wavelength. This test shows the extent of oxidation of impurities by permanganate by measuring the intensity of yellow coloration due to oxidation product formed. P.N. values in this application are calculated by multiplying the measured optical denisty by 100, "optical density" being defined as $log_{10}$ (light transmitted by the solvent/light transmitted by the solution). Thus N.P.=0.0 corresponds to 100% transmissivity
  =1.0 corresponds to 97.7% transmissivity
  =2.0 corresponds to 95.5% transmissivity
  =4.0 corresponds to 91.2% transmissivity
  =9.0 corresponds to 81.3% transmissivity, etc.

Among other proposals to remove oxidizable impurities, distillation of caprolactam in presence of aqueous sodium hydroxide has been suggested. It has been disclosed in the art that this procedure results in considerable losses of caprolactam.

We have now found that when caprolactam; alkali metal hydroxide of the group consisting of sodium hydroxide, potassium hydroxide, and their mixtures; and water are mixed in certain critical concentration and temperature ranges, a caprolactam liquid layer can be separated practically quantitatively from an aqueous caustic (i.e. alkali metal hydroxide) layer; and upon vacuum distillation of the caprolactam layer, caprolactam is recovered in practically quantitative yield and with greatly reduced content of oxidizable organic impurities as shown by greatly decreased permanganate number of the recovered caprolactam compared to the starting caprolactam. A permanganate number of zero can readily be obtained using our process.

Our process comprises forming a mixture consisting essentially of the three ingredients caprolactam, alkali metal hydroxide and water and containing not more than about 10 parts by weight of impurities per 90 parts by weight of caprolactam, said mixture having therein at least about 1% by weight of caprolactam and at least about 5% alkali metal hydroxide; the weight proportions of caprolactam:alkali metal hydroxide:water lying about in the quadrilateral on an equilateral triangular composition diagram bounded by the lines connecting points at about (1% lactam, 69% alkali metal hydroxide, 30% water); (1% lactam, 19% alkali metal hydroxide, 80% water); (55% lactam, 5% alkali metal hydroxide, 40% water); (93% lactam, 5% alkali metal hydroxide, 2% water); and establishing in said mixture temperatures within the range from about 15° C. to about 75° C. Two liquid phases are formed, one being caprolactam substantially free of alkali metal hydroxide and the other being an aqueous caustic phase substantially free of lactam. The caprolactam phase is separated from the aqueous caustic phase; and purified caprolactam is recovered by distilling the separated caprolactam.

At the lower limits of alkali metal hydroxide concentrations useful in accordance with our invention there is a tendency towards emulsification of the liquid phases. At relatively high concentrations of alkali metal hydroxide or of lactam, such as about 40% or more of either, and at relatively low temperatures such as 50° C. and below, there is a sizable region within the above defined composition limits in which solid caprolactam will separate together with, or instead of, a liquid caprolactam layer. The desired two liquid phase mixture can be obtained by warming such mixture containing solid lactam. Temperatures higher than 75° C. can be used during the caustic treatment, e.g. 80° C.; but the mixture must be brought to about 75° C. or below to induce phase separation.

For most convenient and effective operation we use temperatures in the range 35°-50° C. and weight concentrations of lactam, alkali metal hydroxide, and water within a selected area of the above defined quadrilateral, bounded by the lines connecting the points (15% lactam, 35% caustic, 50% water); (15% lactam, 20% caustic, 65% water); (48% lactam, 10% caustic, 42% water); (67% lactam, 10% caustic, 23% water).

The accompanying drawing is a 3-component composition diagram representing weight percent compositions. In the drawing the area ABCD represents the broad compositions useful in our invention; and the area EFGH represents the preferred compositions employed, whereby at temperatures of about 40° C. the desired two liquid phase mixtures will be obtained without further heating, using either sodium hydroxide or potassium hydroxide as the caustic ingredient.

The following examples are specific embodiments of our process, illustrating our invention and the best mode contemplated by us of carrying it out.

The general procedure employed for the examples was as follows. Crude caprolactam analyzing by weight approximately 67% lactam, 2% impurities and 31% water was concentrated by evaporation down to 5% water. The resulting lactam was filtered to remove inorganic salts. A mixture was formed with aqueous sodium hydroxide and additional water needed to produce the compositions shown in the table below and the mixture was agitated at the temperature shown in the table. The mixture was then transferred to a separator and the sodium hydroxide phase was drawn off from the bottom.

The caprolactam layer thus separated was distilled under pressures of about 3–5 mm. absolute and at temperatures not exceeding about 150° C. in the evaporator to assure that the lactam would not be adversely affected by the distillation operation. The distilled lactam was then diluted with water and crystallized by freezing along the lines of Joris U.S. Patent 2,813,858. The permanganate numbers were determined after each crystallization, and are listed in the table below under the abbreviation "P.N."

For comparison, the lactam used for the treatment of the examples was distilled and crystallized in the same way as above outlined but without mixing it with sodium hydroxide. These comparison tests are listed in the table below under the heading "Control." One lactam material was used for Examples 1–3, to test quantitatively the percent reduction of permanganate number obtainable in each of 4 crystallization stages; the result was approximately 50% per stage versus the control. A second, purer lactam was used for Examples 4–7 demonstrating that by our process, permanganate number of zero is readily obtained.

TABLE I

| | Percent lactam | Percent NaOH | Percent H₂O | °C. temp. | P.N. after crystallization | | | |
|---|---|---|---|---|---|---|---|---|
| | | | | | 1 | 2 | 3 | 4 |
| Ex. 1 | 20 | 20 | 60 | 50 | 98 | 40 | 18 | 10 |
| Ex. 2 | 20 | 20 | 60 | 30 | 100 | 37 | 12 | 5 |
| Ex. 3 | 53.5 | 7.5 | 39 | 50 | 93 | 32 | 17 | 9 |
| Control for Ex. 1–3. | | | | | 185 | 62 | 29 | 16 |
| Ex. 4 | 40 | 15 | 45 | 40 | 45 | 5 | 1 | 0 |
| Ex. 5 | 40 | 15 | 45 | 50 | 44 | 8 | 2 | 0 |
| Ex. 6 | 40 | 15 | 45 | 60 | 41 | 7 | 3 | 1 |
| Ex. 7 | 40 | 15 | 45 | 70 | 41 | 5 | 2 | 0 |
| Control for Ex. 4–7. | | | | | 73 | 18 | 6 | 3 |

Preferred products have P.N. of 2 or less, i.e. have transmissivity of about 95% or better; especially preferred are products of P.N. about 1 or less, i.e. of transmissivity about 97% or better.

*Example 8*

A run was carried out semi-continuously by preparing lactam with 14–16% by weight water content as described for Examples 1–7, preheating this aqueous lactam to 50° C., preheating 25% by weight sodium hydroxide solution to 50° C. and mixing equal volumes of the two solutions in a flask for about 7 minutes. The weight percent concentrations of lactam, sodium hydroxide, and water in the resulting mixture were 38.5, 13.5, 48 percent.

The mixture was separated into an aqueous lactam layer substantially free of sodium hydroxide, and an aqueous sodium hydroxide layer substantially free of lactam. The lactam layer was distilled under vacuum at about 145° C. and crystallized four times by freezing as described for Examples 1–7.

This lactam layer separated from the sodium hydroxide layer analyzed by weight 83% lactam, 15% water and 2% residue insoluble in toluene. As 20% solution in distilled water it had pH of 12. The specific gravity of this lactam layer at 50° C. was 1.04 and that of the 25% sodium hydroxide solution was 1.25.

The sodium hydroxide solution separated from the lactam layer was made up to its original volume with fresh 25% sodium hydroxide solution; and was then used to treat similarly a new batch of lactam. This procedure was repeated numerous times, until the permanganate numbers for the second and third crystallizations showed a rising trend. During the first reuse the strength of the sodium hydroxide solution dropped to 23.6% and remained at that point for the remainder of the run.

"Number of times caustic reused" in Table II below was calculated as:

$$\text{Total number of batches} \times \frac{\text{Total volume of caustic}}{\text{Original volume of caustic}}$$

Table II below summarizes the results of the above operations.

TABLE II

| Number of times caustic reused | P.N. after crystallization | | | |
|---|---|---|---|---|
| | 1 | 2 | 3 | 4 |
| 4 | 38 | 2 | 0 | 0 |
| 25.5 | 34 | 2 | 0 | 0 |
| 36.5 | 55 | 16 | 1 | 0 |
| 50 | 39 | 11 | 2 | 0 |
| Control | 59 | 9 | 4 | 2 |

The yield of purified lactam was essentially quantitative from the final distillation step.

As demonstrated by Example 8 the process of our invention can be carried out continuously, e.g. in a baffled column with a central agitated mixing zone and counter current flow or in an agitated vessel overflowing into a phase separator. Contact times have been found not to be critical; times from one minute to about 2 hours have been used successfully.

*Example 9*

A mixture of 2000 ml. of 85% caprolactam in water and 2000 ml. of 25% KOH was agitated for 15 minutes and separated at 30° C.

The caprolactam layer was purified in the same manner as when washed with sodium hydroxide in Examples 1–8 above.

Results are as follows:

| | P.N. after crystallization | | | |
|---|---|---|---|---|
| | 1 | 2 | 3 | 4 |
| Control not washed | 110 | 48 | 19.5 | 12.5 |
| Run 1 washed as described | 64 | 17 | 13 | 9 |
| Run 2 washed as described | 71 | 20 | 13 | 8 |

We claim:

1. Process for removing, from crude epsilon-caprolactam, impurities therein oxidizable by potassium permanganate which process comprises forming a mixture consisting essentially of the three ingredients epsilon-caprolactam; alkali metal hydroxide of the group consisting of sodium hydroxide, potassium hydroxide, and their mixtures; and water and containing not more than about ten parts by weight of impurities per 90 parts of caprolactam, said mixture having therein at least about 1% by weight of caprolactam and at least about 5% alkali metal hydroxide; the weight proportions of caprolactam:alkali metal hydroxide:water lying about in the quadrilateral on an equilateral triangular composition diagram bounded by the lines connecting points at about the point [1% lactam, 69% alkali metal hydroxide, 30% water], [1% lactam, 19% alka metal hydroxide, 80% water], [55% lactam, 5% alkali metal hydroxide, 40% water], [93% lactam, 5% alkali metal hydroxide, 2% water]; and establishing in said mixture temperatures within the range from about 15° C. to about 75° C.; separating liquid caprolactam phase from the aqueous alkali metal hydroxide phase; and recovering purified caprolactam by distilling the separated caprolactam.

2. Process as defined in claim 1 wherein the weight concentrations of lactam, alkali metal hydroxide, and water are within hte quadrilateral on an equilateral composition diagram bounded by the lines connecting the points [15% lactam, 35% caustic, 50% water], [15% lactam, 20% caustic, 65% water], [48% lactam, 10% caustic, 42% water], [67% lactam, 10% caustic, 23% water] and temperatures of the mixture are maintained in the range of about 35°–50° C. at least during the phase separation step.

3. Process as defined in claim 2 wherein the alkali metal hydroxide used is sodium hydroxide.

References Cited in the file of this patent

UNITED STATES PATENTS 2,667,483    Zeegers    Jan. 26, 1954

FOREIGN PATENTS 708,034    Great Britain    Apr. 28, 1954

UNITED STATES PATENT OFFICE
CERTIFICATE OF CORRECTION

Patent No. 3,021,326                                February 13, 1962

Orvill E. Snider et al.

It is hereby certified that error appears in the above numbered patent requiring correction and that the said Letters Patent should read as corrected below.

Column 1, line 38, for "N.P." read -- P.N. --; column 4, line 47, for "alka" read -- alkali --; line 57, for "hte" read -- the --.

Signed and sealed this 24th day of July 1962.

(SEAL)
Attest:

ERNEST W. SWIDER
Attesting Officer

DAVID L. LADD
Commissioner of Patents